US012694337B2

(12) United States Patent
Siddhamalli et al.

(10) Patent No.: US 12,694,337 B2
(45) Date of Patent: Jul. 28, 2026

(54) AUGMENTED FEATURE ENABLEMENT OF MACHINE LEARNING MODELS VIA GRAPH NEURAL NETWORKS

(71) Applicant: VERIZON PATENT AND LICENSING INC., Basking Ridge, NJ (US)

(72) Inventors: Ganesh Siddhamalli, Telangana (IN); Gopala Krishnan Sankara Narayanan, Chennai (IN); Navin Dalavai Premkumar, Chennai (IN); Sivakumaran Elangovan, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 666 days.

(21) Appl. No.: 18/301,508

(22) Filed: Apr. 17, 2023

(65) Prior Publication Data

US 2024/0346368 A1 Oct. 17, 2024

(51) Int. Cl.
*G06N 20/00* (2019.01)
(52) U.S. Cl.
CPC .................................... *G06N 20/00* (2019.01)
(58) Field of Classification Search
CPC .......... G06N 20/00; G06N 3/045; G06N 3/08; G06N 5/022
See application file for complete search history.

(56) References Cited

U.S. PATENT DOCUMENTS

| | | | | |
|---|---|---|---|---|
| 2021/0133612 A1* | 5/2021 | Sinha | ...................... | G06F 30/20 |
| 2021/0406779 A1* | 12/2021 | Hu | ........................... | G06N 5/02 |
| 2024/0054356 A1* | 2/2024 | Liu | ........................ | G06N 20/00 |

OTHER PUBLICATIONS

Zhang, Zeyu, et al. "Cross message passing graph neural network." 2020 International Joint Conference on Neural Networks (IJCNN). IEEE, 2020. https://ieeexplore.ieee.org/stamp/stamp.jsp?tp=&arnumber=9207357 (Year: 2020).*

* cited by examiner

*Primary Examiner* — Michael H Hoang

(57) ABSTRACT

In some aspects, the techniques described herein relate to a method including: retrieving properties associated with a plurality of machine learning (ML) models; building a graph data structure using the properties, the graph data structure including nodes corresponding to the properties and edges representing connections between the properties; training a multi-stack message-passing graph neural network (MSMPGNN) using the graph data structure; inputting a graph fragment into the MSMPGNN; generating a prediction based on the graph fragment using the MSMPGNN; and displaying the prediction to a user.

20 Claims, 7 Drawing Sheets

AUGMENTED FEATURE ENABLEMENT OF MACHINE LEARNING MODELS VIA GRAPH NEURAL NETWORKS

BACKGROUND INFORMATION

Feature engineering is frequently time-consuming and resource-intensive in machine learning (ML) systems. To mitigate these issues, some systems centrally store and manage engineered features for reuse in downstream ML models and applications. These systems generally use row-oriented or column-oriented databases to manage features.

DETAILED DESCRIPTION

Figure 1:
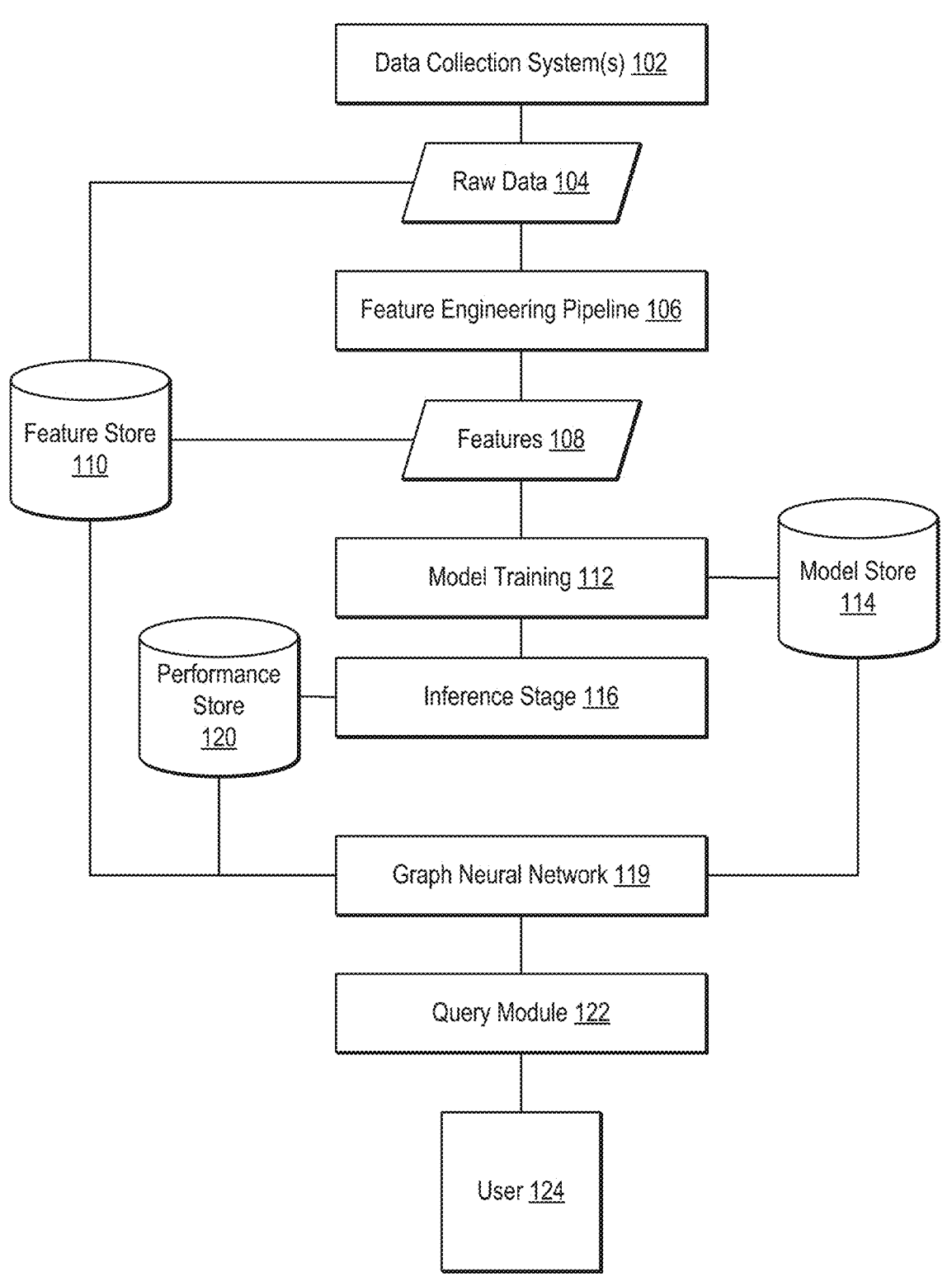
FIG. 1 is a block diagram illustrating a system for generating predictions using a multi-stack message-passing graph neural network (MSMPGNN) generated based on an ML system.

The example embodiments provide a system that uses an MSMPGNN to represent various parameters of an ML system. In some implementations, this MSMPGNN is trained using message passing and used to predict features and other data of potential new models added to the ML system. The outputs of the MSMPGNN may be used to drive the development of other ML models. For example, the outputs of the MSMPGNN may be used to identify features used during the training of any given ML model and also during inference once the ML model is trained. In contrast to existing techniques that rely on row or column-oriented data, the use of an MSMPGNN enables highly correlated feature discovery that can increase the development speed of new ML models for various use cases. In existing techniques, in an enterprise there are many data scientists testing and using different ML models all with varying features to apply to their particular problem, without knowledge of what other useful features may have already been used in other models which may be beneficial for their model. In order to take advantage of existing data engineering work already performed by data scientists, these features are often stored in a feature store. However, finding relevant features in a feature store is still a difficult process and therefore there is a need for finding and extracting useful features for new models in order to augment the model's existing feature set.

The disclosed embodiments relate to using graph-based techniques for feature discovery and enablement. In some of the disclosed implementations, a method is disclosed that includes first retrieving properties associated with machine learning (ML) models. The method then includes building a graph data structure using the properties where the graph data structure including nodes corresponding to the properties and edges representing connections between the properties. The method then trains a multi-stack message-passing graph neural network (MSMPGNN) using the graph data structure. During inference, the method inputs a graph fragment into the MSMPGNN to generate a prediction based on the graph fragment using the MSMPGNN. This prediction (e.g., features) can then be used for training a new ML model.

In some aspects, the properties in the graph can include raw features used by the plurality of ML models, derivative features used by the plurality of ML models, categories of the plurality of ML models, feature significance values associated with the plurality of ML models, category feature significance values associated with the plurality of ML models, and performance statuses associated with the plurality of ML models.

In some aspects, the method can train the MSMPGNN by, for a given ML model in the ML models, initializing a state of the given ML model to a default state, acquiring at least one hidden state of a second ML model in the graph data structure, and updating the state of the given ML model based on the at least one hidden state. In some aspects, training the MSMPGNN can further include iteratively acquiring a plurality of additional hidden states for a plurality of other ML models in the plurality of ML models and iteratively updating the state of the given ML model based on the plurality of additional hidden states. In some implementations, training the MSMPGNN can include computing, for each node, a positional embedding based on an aggregation of positional embeddings for all neighbors in a neighborhood of a respective node.

In some aspects, the MSMPGNN may be continuously retrained in response to a trigger. This trigger can include detecting a new ML model added to the plurality of ML models; detecting a new feature added to an ML model in the plurality of ML models; detecting a performance change in one of the plurality of ML models; detecting a new category of ML model; or receiving a request for re-training from a user.

The inputs and outputs of the MSMPGNN may take various forms. First, inputting a graph fragment into the MSMPGNN includes inputting an ML model category and generating a prediction based on the graph fragment includes generating a graph including a set of predicted features for the ML model category. Second, inputting a graph fragment into the MSMPGNN includes inputting an ML model category and a performance indicator and generating a prediction based on the graph fragment includes generating a graph including a set of predicted features for the ML model category. Third, inputting a graph fragment into the MSMPGNN includes inputting a feature and generating a prediction based on the graph fragment includes generating a graph including a set of model categories and derivative features. Fourth, inputting a graph fragment into the MSMPGNN includes inputting an ML model category and a feature and generating a prediction based on the graph fragment includes generating a graph including a set of derivative features. Other input/output patterns are also described herein.

FIG. 1 is a block diagram illustrating a system for generating predictions using an MSMPGNN generated based on an ML system.

The system includes one or more data collection systems 102. In some implementations, one or more data collection systems 102 may comprise any type of computing system that collects and/or generates data. For example, one or more data collection systems 102 may include a billing system, a system monitoring data usage in a cellular network, a user database, a mobility manager of a cellular network, etc. In general, no limit is placed on the type of computing device in one or more data collection systems 102. In general, the one or more data collection systems 102 will include an application programming interface (API) or similar interface to allow systems to securely access raw data 104 recorded in such systems. Such an API may provide a web-based API for accessing such data, or a similar type of access.

As one example, a feature engineering pipeline 106 may access raw data 104 stored by one or more data collection systems 102. In some implementations, feature engineering pipeline 106 may comprise a server or other computing device configured to access the APIs of one or more data collection systems 102 to access the raw data 104 for training and inference purposes. In some implementations, feature engineering pipeline 106 can be part of an ML system that developers utilize to design, train, test, and ultimately deploy ML models. In some implementations, feature engineering pipeline 106 can be configured to load raw data 104 from one or more data collection systems 102 and apply zero or more transformations to the raw data 104 to generate features 108. In some implementations, the feature engineering pipeline 106 may perform no transformations, passing raw data 104 as features 108. In some implementations, feature engineering pipeline 106 may perform data cleaning transformations to convert potentially unstructured raw data 104 into vectors suitable for ML. In yet other scenarios, feature engineering pipeline 106 may apply more significant processing to the raw data 104 (e.g., summing, aggregation, counting, etc.) to generate derived or derivative features. Further, in some implementations, such processing can be performed not only on raw data but on existing features to generate second-order, third-order, and n-order derivative features.

In some implementations, all features generated by feature engineering pipeline 106 can be persisted to a feature store 110. In some implementations, feature store 110 can comprise a database or similar storage mechanism that stores features 108 generated by feature engineering pipeline 106. In some implementations, feature store 110 stores the features 108 themselves. However, feature store 110 may also store metadata describing the features. For example, feature store 110 may store a list of other features used to derive any given feature. In some implementations, feature store 110 may be separate from model store 114 and performance store 120; however, in other implementations, the three data stores may be combined into a single storage platform.

In an implementation, the system includes a model training phase 112. In some implementations, model training phase 112 can include training one or more ML models using features 108. The specific types of ML models trained in model training phase 112 are not limited and any type of ML model may be trained (e.g., deep neural networks, random forests, logistic or linear regression, etc.). In general, an ML model may be represented as a data structure containing, for example, weights or parameters. These model data structures can be stored after training in model store 114. In some implementations, model store 114 may comprise a special-purpose storage device for storing ML model parameters and other data. In some implementations, the model store 114 can store versions of the same model for monitoring changes in features and their contributions to the model over time.

After training, an ML model may be placed in production during inference stage 116. During inference stage 116, the model can be used to make predictions on new data. The illustrated system includes a performance store 120 that can store performance metrics of the trained models. In some implementations, these performance metrics can take various forms (e.g., loss functions) that monitor how well a model performs with unseen data different than the training data. In some implementations, performance store 120 can store performance metrics generated using a test data set (i.e., prior to inference and using a holdout dataset). Alternatively, or in conjunction with the foregoing, performance store 120 can store performance measurements can record how well a model performs during the inference stage 116. Although illustrated separately, in some implementations, model store 114 and performance store 120 may be combined as a single store for model data.

In an implementation, the system further includes an MSMPGNN 119. In an implementation, MSMPGNN 119 comprises a message passing MSMPGNN that is built using a graph of parameters generated by the foregoing components. Details of the operation of MSMPGNN 119 are provided in more detail in FIG. 2 and FIG. 3 and are not repeated herein. In brief, MSMPGNN 119 can construct a graph data structure of model data by accessing feature store 110, model store 114, performance store 120 and any other data store used during the training of models. MSMPGNN 119 can use this graph to build a graph-level representation of the ML system using message passing. Further, MSMPGNN 119 can receive queries (e.g., graph fragments) from a query module 122 that are supplied by a user 124 as well as objectives and generate one or more predictions based on the input and objective.

Figure 2:
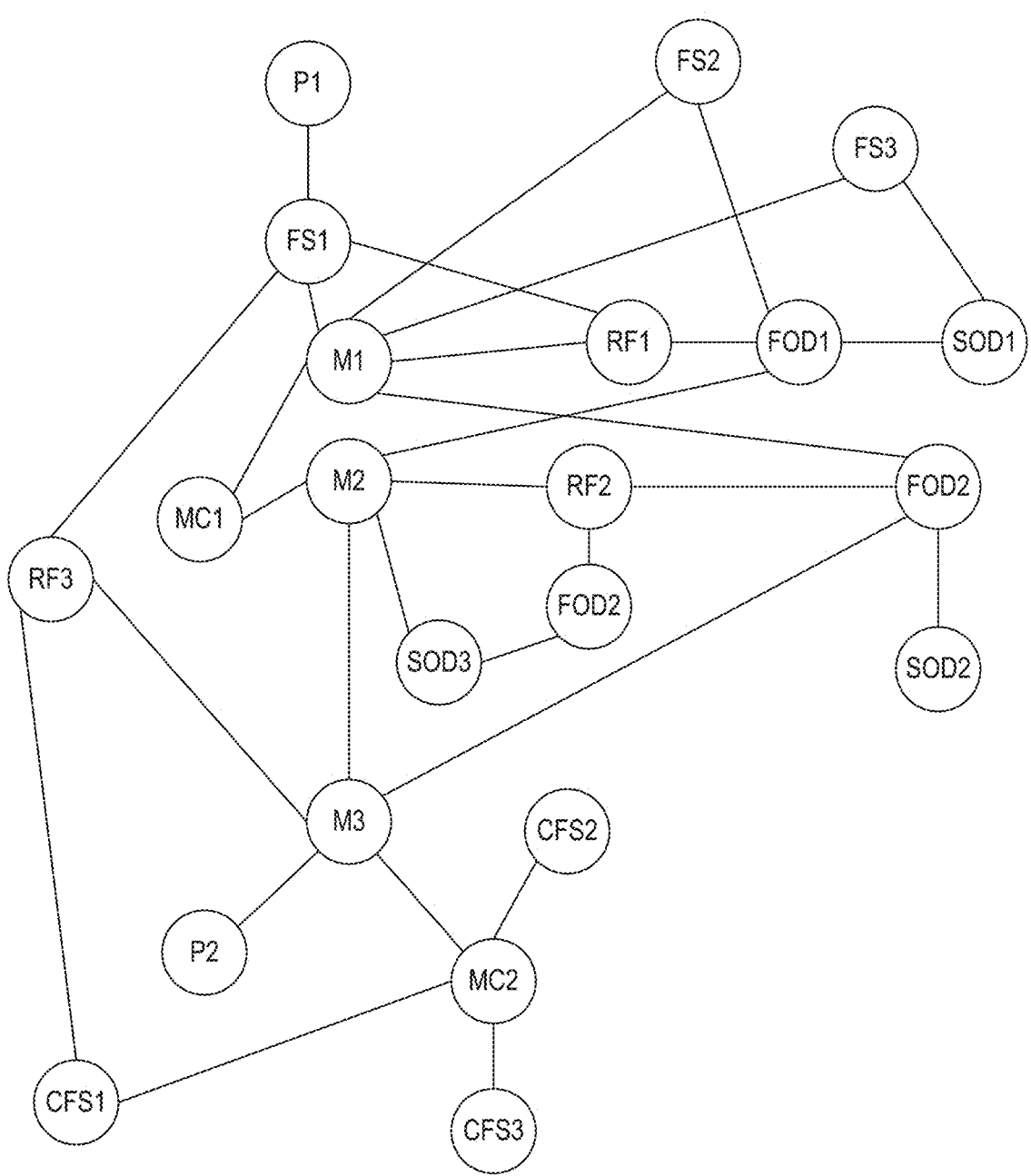
FIG. 2 is a block diagram of an example ML system graph.

FIG. 2 is a block diagram of an example ML system graph.

As discussed above, a graph data structure may be built based on the properties of an ML system. As discussed, an ML system may comprise various hardware and software components that support the development of ML models. During the development, testing, and deployment of such ML models, various parameters associated with the ML models can be recorded, accessed, and converted into a graph data structure. FIG. 2 illustrates, graphically, such a graph data structure. While FIG. 2 depicts a graphical representation of a graph data structure, the disclosure is not limited as such. For example, the same graph may be stored as an adjacency matrix, adjacency list, or similar type of data structure. Use of a graphical representation is presented solely for convenience in describing the graph. Further, the specific properties of the graph illustrated in FIG. 2 are not limiting. Indeed, the graph data structure may include more (or fewer) nodes/vertices and edges. Further, while the nodes in FIG. 2 are depicted as only including labels, in practice each node and/or edge may include more detailed data describing the underlying parameter. Indeed, each node or edge may be associated with its own feature vector utilized during training of the MSMPGNN.

The graph data structure illustrated in FIG. 2 depicts an exemplary ML system that includes three ML models: M1, M2, and M3. These ML models may comprise any type of ML model or similar type of algorithm or parameterized system. For example, the ML models may comprise deep learning networks or similar networks. The graph data structure illustrates connections between these ML models and other parameters of the ML system. As illustrated, these connections may comprise undirected edges of the graph data structure although directed edges may also be used and no limit is placed on the directionality of the graph data structure. In some implementations, ML models can be connected via relationships as illustrated by edge (M2, M3).

In some implementations, this relationship can be a "feeds" relationship in that the output of M2 is input to M3.

The graph data structure of FIG. 2 further includes various features including raw features (RF1, RF2, RF3), first-order derivative features (FOD1, FOD2, FOD3), and second-order derivative features (SOD1, SOD2, SOD3). A raw feature refers to, for example, a raw data item retrieved from a data source. In general, a raw feature may undergo little or no pre-processing. In some implementations, a given model may directly use such raw features for training. By contrast, first-order features and second-order features comprise features that are derived from raw features or first-order features, respectively. In general, these n-order features comprise features after applying operations on raw features and, if applicable any intervening n-order features. As a simplistic example, considering a raw feature of "day of the year" (an integer between 1 and 366), a first-order derivative feature may comprise a "weekday" (an integer between 1 and 7) while a second-order derivative feature may comprise a "is weekend?" feature (a Boolean value). Certainly, other types of transformations (including aggregations) are possible.

In general, a first set of relationships may comprise "directly uses" relationships. For example, M1 directly uses RF1, and FOD2. Thus, edges (M1, RF1) and (M1. FOD2) may comprise directly using relationships between these nodes. Similarly, edges (M2, FOD1), (M2, RF2), (M2, SOD3), (M3, FOD2), and (M3, RF3) may also comprise directly using relationships. Such relationships can be built by analyzing feature plans of the various models M1, M2, and M3 to identify these relationships. Similarly, relationships among features may also be recorded as, for example, a "transforms to" relationship. Thus, for example, edge (RF1, FOD1) represents that RF1 "transforms to" FOD1 in one or many models. The edges (RF2, FOD3), (FOD1, SOD1), (FOD2, SOD2), and (FOD3, SOD3) likewise represent transforming relationships. In general, such derived feature data may also be stored in the feature store which can include metadata about features used to create each derived feature, the type of transformation used to create each derived feature (e.g., mean, sum, count, etc.), the parameters of the transformation used to create each derived feature (e.g., window size for rolling aggregations), the mathematical formula used to create each derived feature, if applicable, and the dependencies between features, such as whether certain features are required to be present in order for other features to be computed. This data can be encoded as a feature vector associated with a given edge.

The graph data structure of FIG. 2 further includes model categories (MC1, MC2). In some implementations, model categories can be manually assigned by ML developers to each model and used as a general categorization of each model. These categories can be stored with a model's metadata and retrieved to build a "belongs to" relationship between the ML models and the categories: (M1, MC1), (M2, MC1), and (M3, MC2).

The graph data structure of FIG. 2 further includes post-training parameters including feature significance values (FS1, FS2, FS3), model category feature significance values (CFS1, CFS2, CFS3), and performance measurements (P1, P2). In general, these parameters can be generated either immediately after training (as with significance values) or after an inference period (as with P1 and P2) in which the performance of a model is measured. In general, the feature significance values are associated with individual features, as represented by edges (RF3, FS1), (RF1, FS1), (FOD1, FS2), and (SOD1, FS3). More edges may be present and only a subset are depicted. In general, feature significance values (FS1, FS2, FS3) represent how significant a feature is to a given model (e.g., M1). Various techniques can be used to gauge feature significance including, but not limited to, permutation importance, built-in measurements (as in decision trees and random forests), correlation-based methods, or using a separate model to measure significance.

Similarly, category feature significance values (CFS1, CFS2, CFS3) may comprise values representing how significant a given feature is to a class of models as represented, for example, by edges (CFS1, MC2), (CFS2, MC2), and (CFS3, MC2). In some implementations, individual feature significance for all ML models in a given category can be aggregated (e.g., averaged) and used as the category feature significance.

Finally, the performance measurements (P1, P2) can comprise measurements of how well a given model (M1, M2, M3) performs during testing and/or inference. For example, Fl scores, mean-squared error (MSE), mean absolute error (MAE), area under the receiver operating characteristic curve (AUC-ROC), log-loss, R-squared, or similar type of metrics can be used to assess the performance of a given model. As illustrated, each model can have a single score (M1, P1) and (M3, P2) but in other implementations models may have multiple scores, including a same metric recorded over time.

Figure 3:
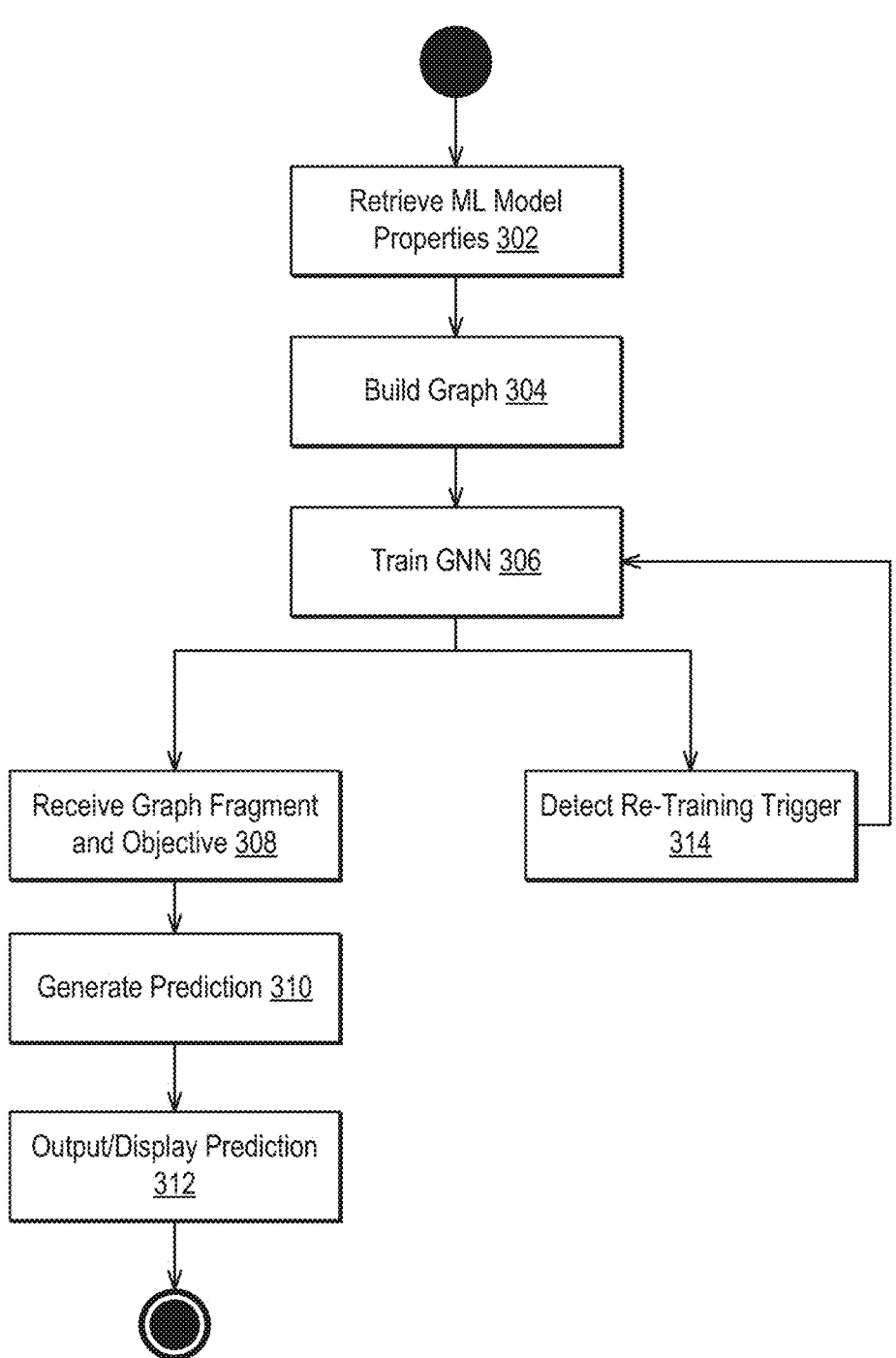
FIG. 3 is a flow diagram illustrating a method for generating predictions using an MSMPGNN generated based on an ML system.

FIG. 3 is a flow diagram illustrating a method for generating predictions using an MSMPGNN generated based on an ML system.

In step 302, the method can include retrieving ML model properties.

In some implementations, step 302 can include accessing a feature store or similar repository of ML system data. As discussed in connection with FIG. 1, during the development, testing, and deployment of ML models, an ML system can record various parameters and measurements (referred to collectively as "properties") of each of the ML models. Further, as ML models are adjusted and re-trained, the ML system can record versions of such parameters. Such parameters and measurements can be stored in a centralized repository of data that, in step 302, the method can query to obtain the ML model properties. In some implementations, the method can query for all properties for all models of the ML system. In other implementations, only a subset of the ML models may be used.

In step 304, the method can include building a graph data structure.

In some implementations, each ML model can be associated with metadata describing the properties retrieved in step 302. In such a scenario, step 304 can include parsing this metadata to extract both nodes and edges (i.e., relationships). For example, the method can utilize a set of defined node types (e.g., model identifier, raw feature identifier, derivative feature identifier, performance measurement identifier, etc.) and can extract this data from the metadata. In some implementations, the method can then query the metadata to build relationships among the extracted nodes. For example, a given feature may be associated with metadata describing which features were used to generate it. In this scenario, the method can build edges (i.e., relationships) between the feature and its parent features. Indeed, many other types of relationships can be built from the metadata and examples of these nodes and relationships are depicted and described more fully in FIG. 2 and not repeated herein. As discussed, step 304 can comprise generating an adjacency matrix or list for a given set of nodes identified from the ML system properties.

In step 306, the method can include training an MSMPGNN.

In some implementations, the MSMPGNN can be trained by initializing a vector $$\left(h_v^0\right)$$

or state for each vertex (or node) in the graph. The method can execute a series of iterations, where in each iteration each vertex's state is updated by aggregating the states of its neighbors. A combined message received at a vertex v at iteration t can be represented as $$m_v^t = f_1(h_v^t, h_w^t, e_{vw}),$$

where $f_1$ represents a differentiable but arbitrary function that depends on the hidden states and edges of a given vertex, $$h_v^t$$

represents the current state of the given vertex, $$h_w^t$$

represents the hidden state of all neighbors without hidden messages, and $e_{vw}$ represents the state values from edges and nodes (neighbors of neighbors). With these messages, the next state t+1 of a given vertex v can be computed as $$h_v^{t+1} = \mathcal{F}(h_v^t, m_v^t),$$

where $\mathcal{F}$ represents an aggregation function performed over the current vertex state $$\left(h_v^t\right)$$

and the combined message from neighbors $$\left(m_v^t\right).$$

After performing a configurable number of iterations, each vector associated with a vertex can be aggregated using a differentiable readout function R to generate a graph-level representation (ŷ), such that $$\hat{y} = R(h_v^t \mid v \in G),$$

where G represents the graph. In the foregoing process, the function $f_1$ may comprise a differentiable function such as a multi-layer perceptron or similar network while $\mathcal{F}$ may comprise a differentiable, permutation invariant function (e.g., sum, mean, max, etc.). In some implementations, the function R may aggregate the vectors into a fixed length representation of the graph suitable for comparison or downstream modeling.

In GNNs, generally, nodes represent entities and edges represent relationships between these entities. Each node can have a set of features or attributes associated with it. In some cases, these features can be organized into multiple layers or stacks, where each layer represents a different aspect or dimension of the node's information. In the context of graph neural networks, multi-stack nodes may require a more complex feature aggregation and message-passing mechanism to properly incorporate information from different stacks of features when updating node representations during the learning process. This can involve separate message-passing steps for each stack or a combination of different message-passing strategies to capture the relationships between features across different stacks.

To overcome this complexity, the following extension to message-passing can be implemented which considers the relative positions of neighboring nodes during each iteration of message-passing and combining information from different stacks of features.

In some implementations, during training (and during message passing during inference), each node of the graph can be populated with a contextual positional relationship embedding which represents the positions of neighboring nodes relative to a given node at each iteration. More formally, for a given message passing step l+1, the positional embedding of a node i can be represented as $$p_i^{l+1} = f_p(p_i^l, \{p_j^l \mid j \in N_i\}, e_{ij}^l), \text{ where } p_i^{l+1}$$

represents the next positional embedding for node i, $$p_i^l$$

represents the current positional embedding for node $p_i$, $$\{p_j^l \mid j \in N_i\}$$

represents a combination or aggregation of positional embeddings for all neighbors in a neighborhood ($N_i$) of node i, $$e_{ij}^l$$

represents edge vectors between node i and its neighbors, and $f_p$ represents a differentiable function (e.g., MLP).

In general, the position embedding of each node is updated continuously and aids in understanding the relative positions and relationships between nodes, even when such nodes have multiple features. The foregoing multi-stack approach with positional embeddings provides more accurate and meaningful representations which improve the overall performance of the MPGNN.

In step 308, the method can include receiving a graph fragment and objective.

In some implementations, the graph fragment can comprise one or more nodes and zero or more edges. In some implementations, the node can comprise a model category, raw feature, derivative feature, performance measure, feature significance, feature category significance, or generally any type of node as discussed above. In some implementations, the objective can comprise a preconfigured prediction task or output format. In some implementations, the objective can be mapped to a dedicated readout function for processing node-level representations generated by the MSMPGNN, as will be discussed.

In step 310, the method can include generating a prediction.

During step 310, the method can construct a graph that includes the graph fragment. In some implementations, this graph can comprise the graph built in step 304. Next, the method can attach the graph fragment to the graph. In some implementations, the method can initialize the node representations (i.e., vectors) for each node of the graph from step 304 using the graph-level representation generated during training in step 306. Further, the method can include initializing any new nodes or edges with random data. For example, the nodes and edges in the graph fragment received in step 308 can be initialized with random values. Then, during step 310, the method can include performing multiple iterations of message passing (similar to that described with respect to training) to aggregate and update the node-level representations of the graph, including the graph function. Finally, after a pre-defined number of iterations is applied, the method can apply a readout function to the node-level representations to generate a final output. In some implementations, as discussed above, this readout function can be selected based on the defined objective received in step 308. The following are some examples of graph fragments (i.e., MSMPGNN inputs) and objectives (i.e., MSMPGNN outputs or readout functions) to generate a prediction.

In a first example, inputting a graph fragment into the MSMPGNN comprises inputting an ML model category and wherein generating a prediction based on the graph fragment comprises generating a graph including a set of predicted features for the ML model category. Specifically, the graph fragment can comprise a model category and the objective can be to identify the top features (raw or derivative) based on the graph generated by the MSMPGNN. In this scenario, the method can construct a new graph that includes the model category and perform iterations of message passing to generate new vectors for the graph. Then, during the readout phase, the method can select the model category node and extract the most significant features based on the neighborhood hidden states of the nearby nodes.

In a second example, inputting a graph fragment into the MSMPGNN comprises inputting an ML model category and a performance indicator and wherein generating a prediction based on the graph fragment comprises generating a graph including a set of predicted features for the ML model category. Specifically, the graph fragment can include a desired performance measurement node and a model category while the objective can be to identify features that may improve the performance of the model category. In this example, the method can use the iterated neighborhood states of the graph during prediction as well as the positional embeddings of the neighboring nodes of the category to identify relevant features.

In a third example, inputting a graph fragment into the MSMPGNN comprises inputting a feature and wherein generating a prediction based on the graph fragment comprises generating a graph including a set of model categories and derivative features. Specifically, the graph fragment can include a feature and the objective can be to identify potential categories and features. In this scenario, the method can add the feature to the graph with randomized embeddings and perform message-passing to obtain the final graph. Then, the method can analyze the updated node vector for the new feature as well as some or all connected derived feature vectors. In some implementations, the method can further identify all connected model categories to the raw feature.

In a fourth example, inputting a graph fragment into the MSMPGNN comprises inputting an ML model category and a feature and wherein generating a prediction based on the graph fragment comprises generating a graph including a set of derivative features. Specifically, the graph fragment can include a feature and model category and the objective can comprise details of the feature and any derived features. Similar to the third example, in this example the method can add the feature and model category to the graph with randomized embeddings and perform message-passing to obtain the final graph. Then, the method can analyze the updated node vectors as well as the position embeddings to identify potential additional features.

The foregoing examples are exemplary and are not limiting—other inputs and objectives can be defined and the disclosure should not be interpreted as limited as such.

In the foregoing examples, the MSMPGGN can thus be used to perform augmented feature enablement during the development of new ML models. As used herein, feature enablement can refer to the process of selecting, engineering, and activating relevant features from raw data to improve the performance of an ML model. Feature enablement can be broken down into three main steps: feature selection, feature engineering, and feature activation. As illustrated in the foregoing examples, the MSMPGNN can be used to generate a list of augmented features that may be used when training a different ML model, thus improving feature selection as compared to manual or semi-automated approaches to feature selection. Further, the identification of existing engineered features (or potential new engineered features) can improve the feature engineering step of feature enablement, allowing for explainable engineered features when developing ML models. Finally, by allowing for the input of performance indicators to the MSMPGNN, the method can improve feature selection during downstream training since the desired performance and correlated features can be pre-selected, improving training time.

As one example, compared to conventional features (i.e., non-augmented) enablement, an ML developer would likely select many features based on a theoretical understanding of the problem domain. These features are generally treated independently from one another, whereas the model output is modeled as a function that represents a dependency between the output value and the inputs. Certainly, some or many of these features may not be relevant to the predictive output of the ML model and, indeed, may overfit the model. As such, techniques such as low-variance filtering prior to training, coefficient shrinking (e.g., via LASSO regression), or decision tree-based post-training reduction are frequently employed in order to reduce the number of features and/or identify the most important features. Pre-training reductions are necessarily limited to statistical analyses (e.g., removing features that, across a dataset, have a low variance and thus may not be useful for prediction) which can ignore important features. Post-training reduction techniques, while more effective, require further training which is time-consuming, prone to error, and still not guaranteed to improve the performance of a model. By contrast, the above techniques for leveraging an MSMPGNN allow for the generation of a feature query plan (i.e., a list of potential features and other aspects) based on historical, trained models. Thus, by using the embodiments disclosed herein, an ML developer can reliably and programmatically leverage the surfaced relationships among models and features to predict the most useful features in advance. Certainly, pre-existing techniques (e.g., pre- and post-reduction techniques) may still be used, however the use of an MSMPGNN to select the initial set of features necessarily improves the performance of training for such ML models, reducing the computing power (e.g., the number of graphical processing units) as well as the time (both real and computational) needed.

In some implementations, the above process may be executed continuously, e.g., as part of a continuous integration (CI)/continuous deployment (CD) process for model development and deployment. As such, the method can continuously update the MSMPGNN as new models are trained and deployed.

In step 312, the method can include outputting and/or displaying the prediction, portion thereof, or data derived from the portion. In some implementations, the resulting output can be displayed visually to an end user (e.g., via a web interface). In other embodiments, only a relevant sub-graph of the graph may be visualized. In some implementations, the raw data can be transmitted alone or in conjunction with a visual representation of the graph. In some implementations, further data regarding the nodes can be retrieved from a feature store (e.g., metadata regarding features or other nodes) and can be displayed to the user. In some implementations, the prediction can be directly integrated into an integrated development environment (IDE) or similar application to allow for converting the prediction into application code for defining a new ML model.

In some implementations, the prediction (e.g., predicted features) can be represented in a graphical form, illustrating (as one example) the relationship between recommended features for a new ML model and other features used by other models. In some implementations, since the MSMPGNN outputs graph semantics (e.g., an adjacency matrix or similar structure), step 312 may include inputting these semantics into a visualization library (e.g., D3. js) to generate a visual representation of the predicted features or other neural network features (e.g., categories, performance indicators, etc.). The use of graph semantics in representing new features and other properties of a new ML model improves the explainability of the feature enablement process. Specifically, graph semantics inherently establish a relation between the features (raw and derived) and the corresponding models that leverage the features. In addition, the use of a graphical representation improves user experience and allows a wider audience to understand the underlying features and training process for any given ML model.

In step 314, executed in parallel with step 308 through step 312, the method can include detecting a re-training trigger and re-training the MSMPGNN in response. As indicated, re-training can be performed continuously while after an initial training and no limit is placed on the number of times the MSMPGNN can be retrained.

As one example, step 314 can include retraining the MSMPGNN upon detecting that a new ML model was added to the plurality of ML models stored by the ML system. As second example, step 314 can include retraining the MSMPGNN upon detecting that a new feature was added to an existing ML model in the plurality of ML models stored by the ML system. As a third example, step 314 can include retraining the MSMPGNN upon detecting a performance change in one of the plurality of ML models stored by the ML system. As a fourth example, step 314 can include retraining the MSMPGNN upon detecting a new category of ML model added to the ML system. As a fifth example, step 314 can include retraining the MSMPGNN upon receiving an explicit request for re-training from a user. Certainly, multiple such triggers may be monitored concurrently. As illustrated, in many triggers, the method can be informed of changes in the ML system which drives the re-training of the MSMPGNN.

As discussed, in some implementations, after executing the method, an ML development system can further be configured to train one or more models using the output of the MSMPGNN. Thus, in some implementations, the method may further include training one or more new ML models using the query plan generated using the MSMPGNN, which will be discussed in more detail herein.

Figure 4A:
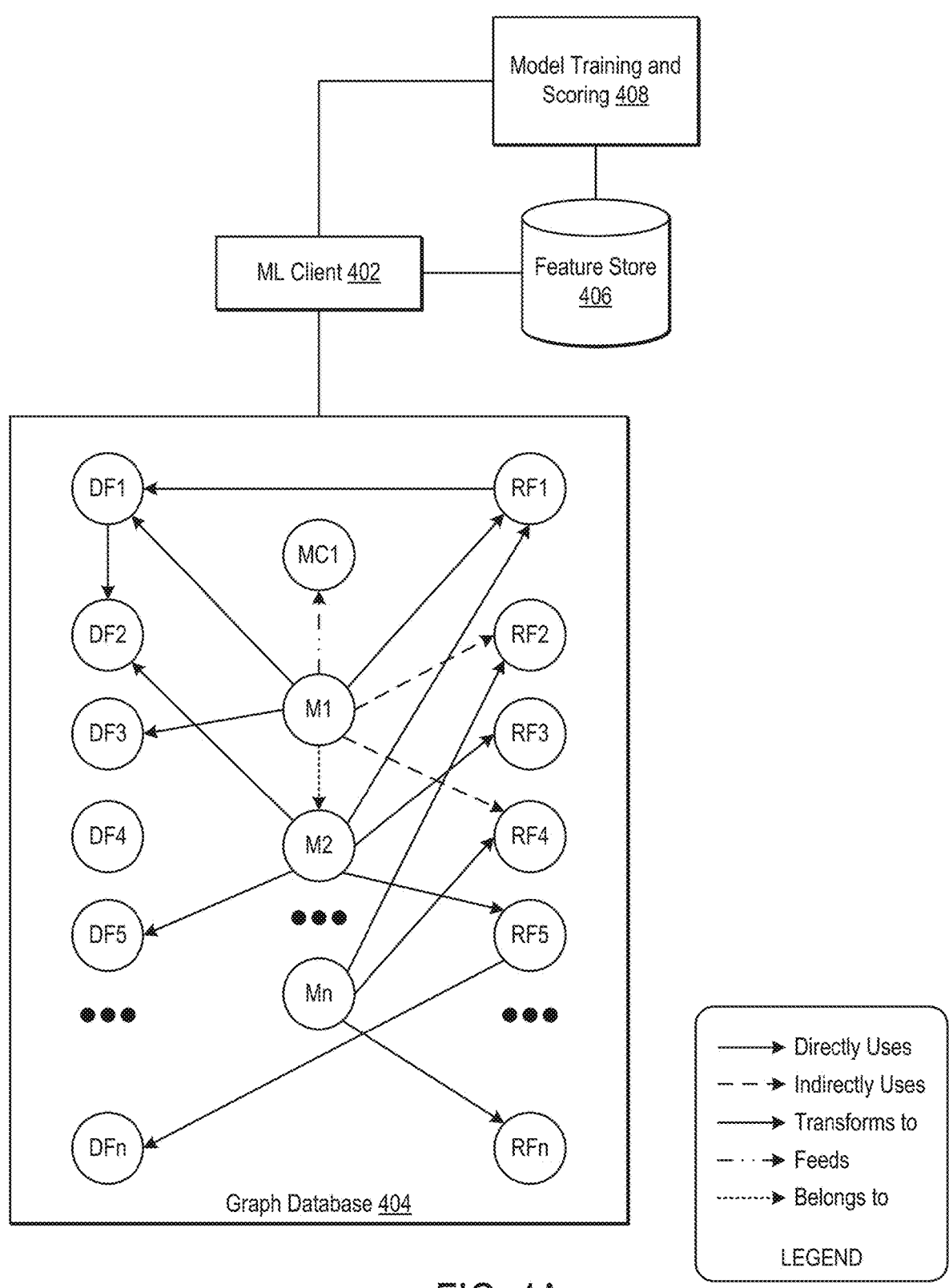
FIGS. 4A through 4C are block diagrams illustrating an ML development system that utilizes a semantic feature graph.
Figure 4B:
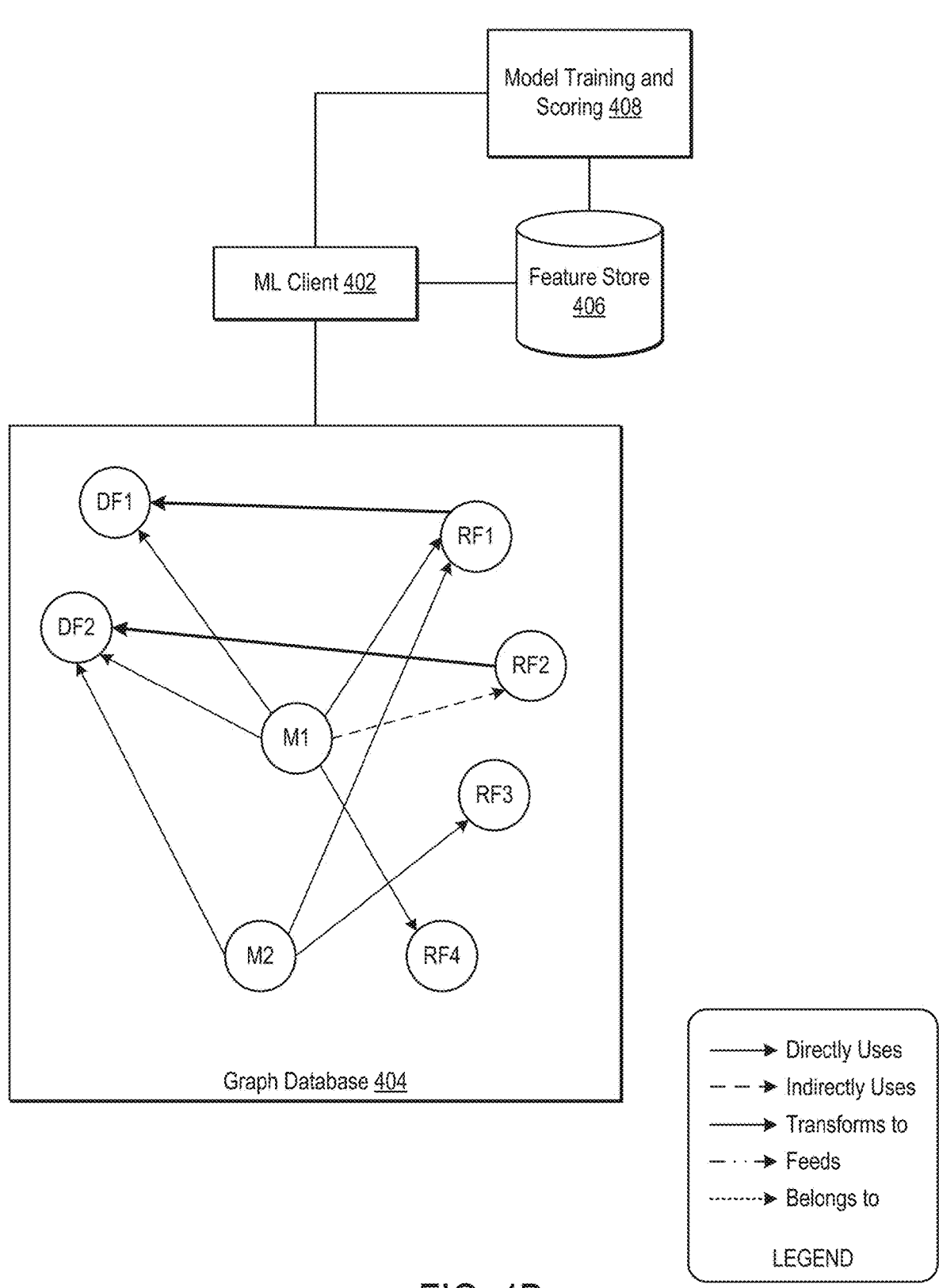
Figure 4C:
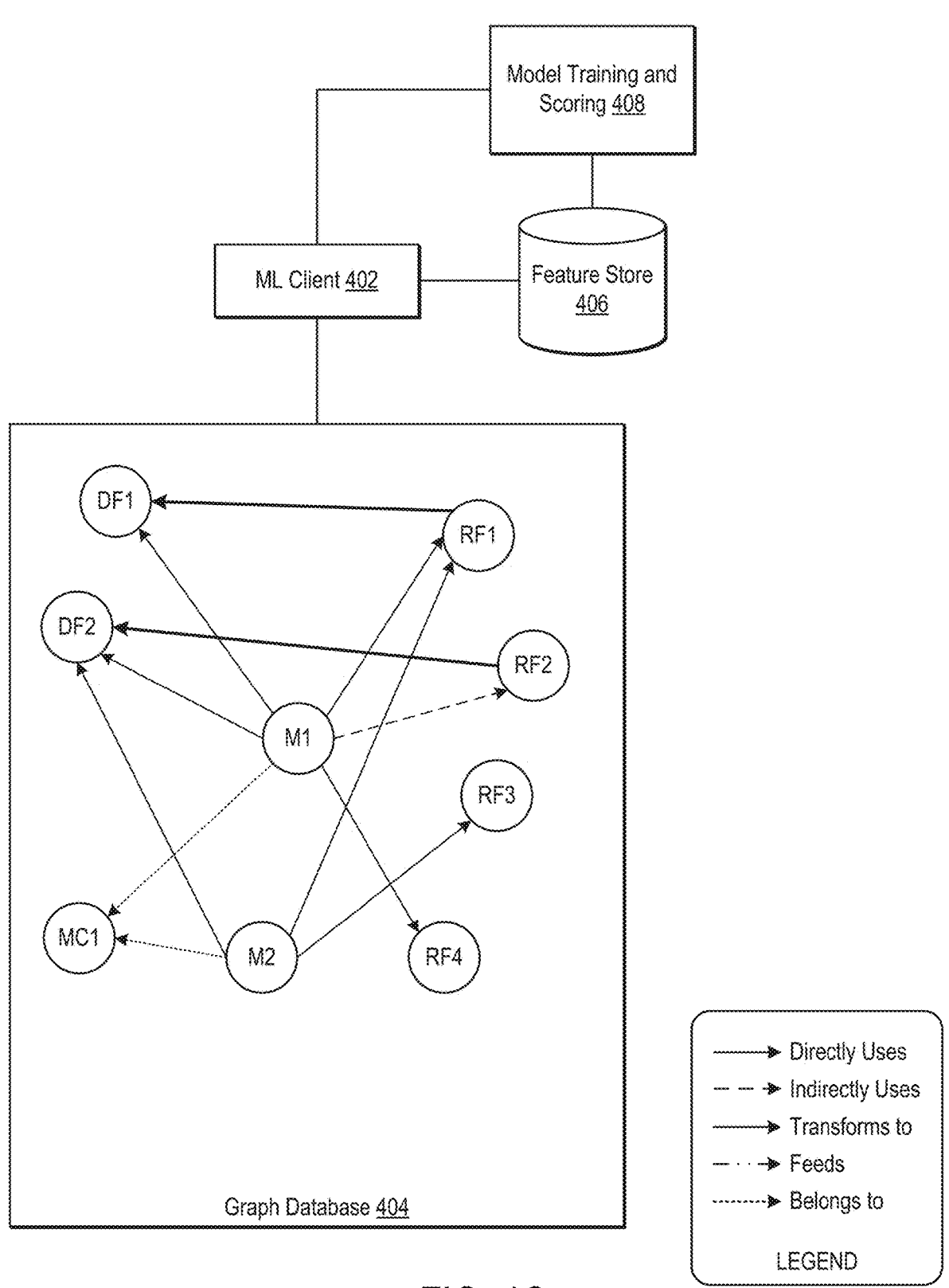

FIGS. 4A through 4C are block diagrams illustrating a ML development system that utilizes a semantic feature graph.

In some implementations, the ML development system can include an ML client 402, graph database 404, feature store 406, and model training and scoring 408. In some implementations, the ML client 402 may comprise a computing device operated by a developer (e.g., a user 124). Contents of graph database 404 are not limiting and FIGS. 4A through 4C represent three examples of a graph stored in graph database 404. Indeed, in some implementations, the three examples may represent the same graph at different stack levels of complexity. The forms of the graph illustrated within graph database 404 generally correspond to the nomenclature used with respect to FIG. 2 and that disclosure is not repeated herein. However, for the sake of clarity, n-th order derivatives are represented as derivative features (DF).

In FIG. 4A, multiple models (M1, M2, . . . . Mn) are illustrated as well as multiple raw features (RF1 through RFn) and derived features (DF1 through DFn) and a category (MC1). In some implementations, the ML client 402 may submit a model definer to the graph database 404. As used herein, a model definer refers to a definition of an ML model that may include properties of the model (e.g., identifier, features, etc.). In conventional systems, model definers and features may be stored in a relational or columnar database and thus complex relationships between these aspects of an ML model are not clearly articulated. By contrast, as illustrated, the graph database 404 stores the relationships between such entities in a graph-oriented feature to illustrate more complex relations. For example, graph database 404 can store the "feeds" relationship between M1 and M2 and the implicit categorization of both such models to MC1 as well as the individual model-feature relationships and feature-feature relationships.

In some implementations, the graph database 404 can return an output derivation responsive to the model definer. In some implementations, this output derivation may comprise a subset of the entire graph stored in graph database 404 that is responsive to a given model definer. Responsive to the output, ML client 402 can perform various functions. In some implementations, the ML client 402 can visualize the output derivation to provide explainability for a given ML model and its underlying features and other parameters. Such a view into the features can allow the ML client 402 to generate a feature plan for use in training and scoring. For example, if the output derivation indicates that M1 directly uses RF1 and only indirectly uses RF2, the ML client 402 can opt to include RF2 as a direct feature during training and scoring. This level of explainability can aid in feature exploration in a more intuitive way than simply receiving the feature plan of an ML model (which fails to expose graph-level semantics of the ML model).

In some implementations, the ML client 402 can issue commands to the feature store 406 after reviewing the output derivation. In some implementations, these commands can cause the feature store 406 to provide various features to scoring 408 for training and scoring. In response, the scoring 408 can provide the trained and/or scored ML model back to ML client 402 for review. Details of this process have been described previously and are not repeated herein. Indeed, existing ML pipelines for retrieving persisted features (which can be separated from the graph-level representation) and training/scoring models may be used in the illustrated configuration.

Notably, in some implementations, the contents of graph database 404 may be persistently stored and the input to the graph database 404 may comprise a known model definer. However, in other embodiments, the system may convert a desired model definer into a graph fragment which can be inserted into the graph database 404 to generate the feature plan as described more fully in step 310.

FIG. 4B illustrates another scenario, wherein ML client 402 can include a specific model identifier as part of (or the entire) model definer. For example, the model definer may specify M1 as the Model ID within a model definer. Here, graph database 404 may return a sub-graph from the entire graph that includes all features (both raw and device) corresponding to the M1 identifier (e.g., RF1, RF4, DF1, DF2). For example, M1 may correspond to a user propensity model and the corresponding features (RF1, RF4, DF1, DF2) may correspond to a latest bill amount, plan identifier, average bill amount, and billing category. The specific features are not limiting. As discussed above, these features can also be output by graph database 404 in a graph format, allowing for visualization of the model and features for explaining the features used for any given model identifier.

FIG. 4C illustrates another scenario. Here, the graph in graph database 404 includes a model category (MC1) that M1 and M2 belong to. In some implementations, the MC1 may be stored in the graph database 404. In other embodiments, the category may input as a graph fragment and associated with M1 and MC2. Here, the graph database 404 can analyze the graph and return the most relevant features based on the weighting of the relationships between M1 and M2 and the corresponding raw and derived features. In some implementations, these features can then be used when developing a new model associated with the MC1 category. For example, ML client 402 can query the feature store 406 using the identified categories and use these features when training and scoring the ML model via scoring 408.

The foregoing embodiments can be used in various manners in downstream ML modeling scenarios or use cases. As a first use case, the foregoing embodiments provide enhanced augmented feature recommendations to improve feature discovery in any particular domain. Specifically, engineers may utilize the disclosed embodiments to generate candidate features to use during model development and inference. By allowing for MSMPGNN-derived features, the disclosed embodiments can dramatically reduce the amount of time spent testing new features and improve both the speed of model development as well as the performance of the ultimate model. As a second use case, the ability of the disclosed embodiments to represent the feature usage and significance on a per-category basis improves the workflow for new models in the same category. Specifically, by providing a graphical representation of the features and significances for a given category, developers can gain a clearer understanding of the interplay of such features and significances across models within a given category. This insight can aid in the categorization of models as well as the feature selection for such categorical models. As a third use case, the novel use of a graph in explaining the feature cohorts and relations across models can provide near instantaneous explainability of models, which can aid both technical and non-technical users in the understanding of ML models. Such a graphical representation can be parsed by downstream visualization tools and rapidly provided to enable real or near real-time visualizations of model features and relations. As a fourth example, the disclosed embodiments can provide recommended query plans that describe the features and relations of models that may be used by ML experimentation tooling. Such an approach can automate preliminary analysis prior to exploration and increase the speed at which experiments can be performed, improving the overall lifecycle of the ML system. In some implementations, these query plans can be programmatically used by experimentation tooling to automatically generate training stages for experimental models.

The preceding disclosure provides numerous benefits that improve the model development lifecycle. The disclosed embodiments can augment existing artificial intelligence and data science platforms and applications to enhance feature enablement and discovery. Graph-based visualizations solve visibility and transparency questions related to reviews and analysis of machine learning predictions (including downstream legal and compliance reviews). Further, the visual explainability of feature-model relations improves the user experience for both technical and non-technical users. The disclosed embodiments provide numerous technical benefits that improve the state of the art. For example, the disclosed embodiments provide systematic enablement of feature discovery based on the dependencies and relations between ML modeling cohorts due to graph data structures and algorithms. Further, the disclosed embodiments reduce the time required for ML model development and experimentation cycles due to predictive feature enablement. Finally, graphical representations of feature-model relations allow users to rapidly visualize the relation between ML model cohorts and systematically validate feature usage and significance.

Figure 5:
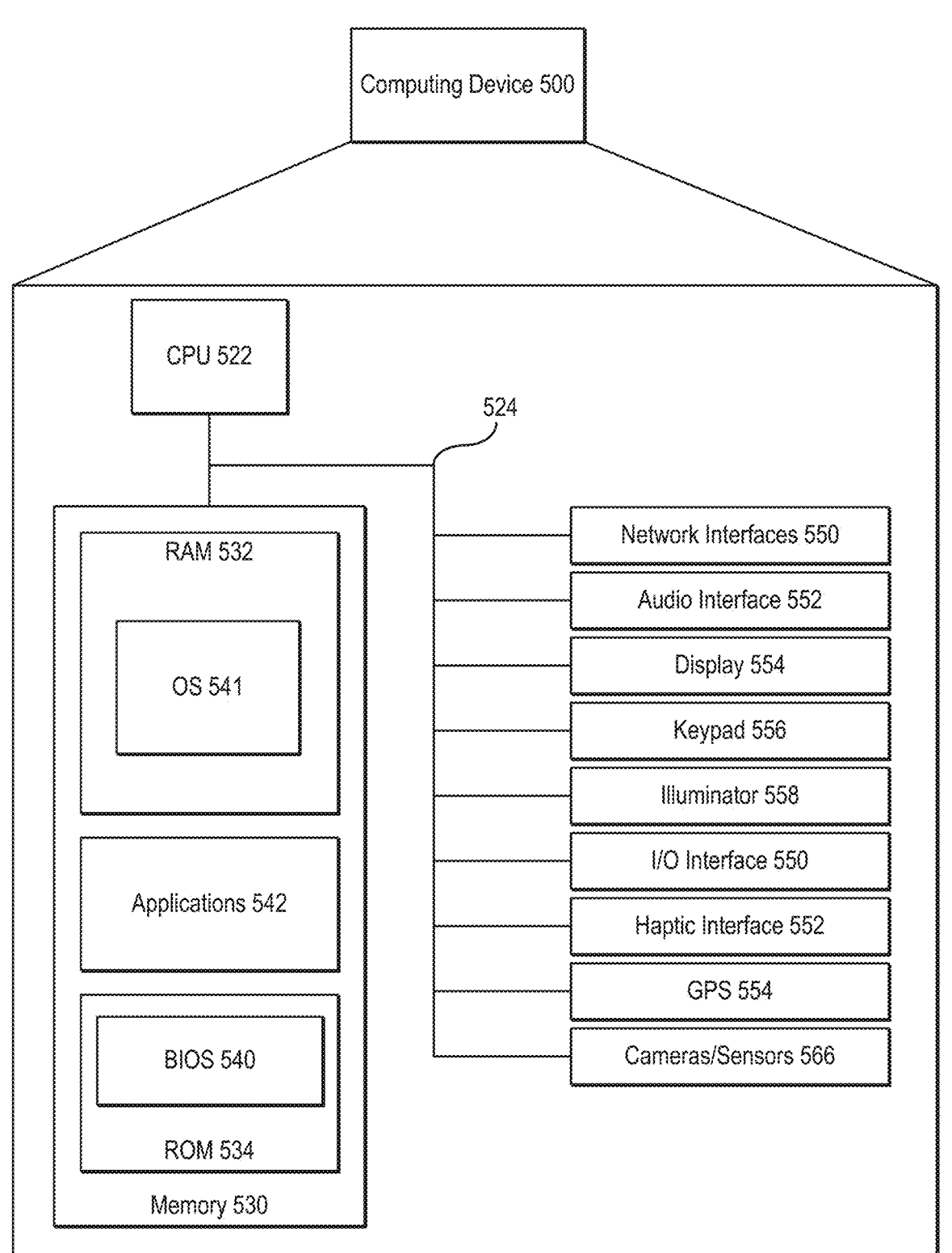
FIG. 5 is a block diagram illustrating a computing device showing an example of a client or server device used in the various embodiments.

FIG. 5 is a block diagram illustrating a computing device showing an example of a client or server device used in the various embodiments of the disclosure.

The computing device 500 can include more or fewer components than those shown in FIG. 5, depending on the deployment or usage of the device 500. For example, a server computing device, such as a rack-mounted server, may not include audio interfaces 552, displays 554, keypads 556, illuminators 558, haptic interfaces 562, Global Positioning Service (GPS) receivers 564, or cameras/sensors 566. Some devices can include additional components not shown, such as graphics processing unit (GPU) devices, cryptographic co-processors, artificial intelligence (AI) accelerators, or other peripheral devices.

As shown in the figure, device 500 includes a central processing unit (CPU) 522 in communication with a mass memory 530 via a bus 524. The computing device 500 also includes one or more network interfaces 550, an audio interface 552, a display 554, a keypad 556, an illuminator 558, an input/output interface 560, a haptic interface 562, an optional global positioning systems (GPS) receiver 564 and a camera(s) or other optical, thermal, or electromagnetic sensors 566. Device 500 can include one camera/sensor 566 or a plurality of cameras/sensor 566. The positioning of the camera(s)/sensor(s) 566 on the device 500 can change per device 500 model, per device 500 capabilities, and the like, or some combination thereof.

In some embodiments, the CPU 522 can comprise a general-purpose CPU. The CPU 522 can comprise a single-core or multiple-core CPU. The CPU 522 can comprise a system-on-A-chip (SoC) or a similar embedded system. In some embodiments, a GPU can be used in place of, or in combination with, a CPU 522. Mass memory 530 can comprise a dynamic random-access memory (DRAM) device, a static random-access memory device (SRAM), or a Flash (e.g., NAND Flash) memory device. In some embodiments, mass memory 530 can comprise a combination of such memory types. In one embodiment, the bus 524 can comprise a Peripheral Component Interconnect Express (PCIe) bus. In some embodiments, the bus 524 can comprise multiple buses instead of a single bus.

Mass memory 530 illustrates another example of computer storage media for the storage of information such as computer-readable instructions, data structures, program modules, or other data. Mass memory 530 stores a basic input/output system ("BIOS") 540 for controlling the low-level operation of the computing device 500. In the illustrated embodiment, the BIOS 540 may be stored in a read-only memory (ROM) such as ROM 534. The mass memory also stores an operating system 541 for controlling the operation of the computing device 500.

Applications 542 can include computer-executable instructions which, when executed by the computing device 500, perform any of the methods (or portions of the methods) described previously in the description of the preceding figures. In some embodiments, the software or programs implementing the method embodiments can be read from a hard disk drive (not illustrated) and temporarily stored in RAM 532 by CPU 522. CPU 522 can then read the software or data from RAM 532, process them, and store them in RAM 532 again.

The computing device 500 can optionally communicate with a base station (not shown) or directly with another computing device. Network interface 550 is sometimes known as a transceiver, transceiving device, or network interface card (NIC).

The audio interface 552 produces and receives audio signals such as the sound of a human voice. For example, the audio interface 552 can be coupled to a speaker and microphone (not shown) to enable telecommunication with others or generate an audio acknowledgment for some action. Display 554 can be a liquid crystal display (LCD), gas plasma, light-emitting diode (LED), or any other type of display used with a computing device. Display 554 can also include a touch-sensitive screen arranged to receive input from an object such as a stylus or a digit from a human hand.

Keypad 556 can comprise any input device arranged to receive input from a user. Illuminator 558 can provide a status indication or provide light.

The computing device 500 also comprises an input/output interface 560 for communicating with external devices, using communication technologies, such as USB, infrared, Bluetooth®, or the like. The haptic interface 562 provides tactile feedback to a user of the client device.

The optional GPS receiver 564 can determine the physical coordinates of the computing device 500 on the surface of the Earth, which typically outputs a location as latitude and longitude values. GPS receiver 564 can also employ other geo-positioning mechanisms, including, but not limited to, triangulation, assisted GPS (AGPS), E-OTD, CI. SAI, ETA, BSS, or the like, to further determine the physical location of the computing device 500 on the surface of the Earth. In one embodiment, however, the computing device 500 can communicate through other components, providing other information that can be employed to determine the physical location of the device, including, for example, a MAC address, IP address, or the like.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to the desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product or software that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as read-only memory ("ROM"), random access memory ("RAM"), magnetic disk storage media, optical storage media, flash memory components, etc.

In this description, various functions and operations are described as being performed by or caused by computer instructions to simplify the description. However, those skilled in the art will recognize what is meant by such expressions is that the functions result from the execution of the computer instructions by one or more controllers or processors, such as a microprocessor. Alternatively, or in combination, the functions and operations can be implemented using special-purpose circuitry, with or without software instructions, such as using Application-Specific Integrated Circuit (ASIC) or Field-Programmable Gate Array (FPGA). Embodiments can be implemented using hardwired circuitry without software instructions or in combination with software instructions. Thus, the techniques are limited neither to any specific combination of hardware circuitry and software nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

We claim:

1. A method comprising:
retrieving properties associated with a plurality of machine learning (ML) models;
building a graph data structure using the properties, the graph data structure including nodes corresponding to the properties and edges representing connections between the properties;
training a multi-stack message-passing graph neural network (MSMPGNN) using the graph data structure, wherein training the MSMPGNN comprises iteratively updating a state of each node in the graph data structure by aggregating hidden states of neighboring nodes using a message-passing function, and computing, for each node, a positional embedding based on a current positional embedding for the node, a combination of positional embeddings for all neighbors in a neighborhood of the node, and edge vectors between the node and neighbors of the node;
inputting a graph fragment into the MSMPGNN, wherein inputting the graph fragment comprises attaching the graph fragment to the graph data structure and initializing node representations of the graph fragment;
generating a prediction based on the graph fragment using the MSMPGNN by performing message-passing iterations on the graph data structure with the attached graph fragment and applying a readout function to node-level representations; and
training a new ML model using the prediction.

2. The method of claim 1, wherein retrieving the properties comprises retrieving one or more of:
raw features used by the plurality of ML models;
derivative features used by the plurality of ML models;
categories of the plurality of ML models;
feature significance values associated with the plurality of ML models;

category feature significance values associated with the plurality of ML models; and
performance statuses associated with the plurality of ML models.

3. The method of claim 1, wherein training the MSMPGNN comprises, for a given ML model in the plurality of ML models:
initializing a state of the given ML model to a default state;
acquiring at least one hidden state of a second ML model in the graph data structure; and
updating the state of the given ML model based on the at least one hidden state.

4. The method of claim 3, wherein training the MSMPGNN further comprises computing, for each node, a positional embedding based on an aggregation of positional embeddings for all neighbors in a neighborhood of a respective node.

5. The method of claim 1, further comprising re-training the MSMPGNN in response to a trigger comprising one of:
detecting a new ML model added to the plurality of ML models;
detecting a new feature added to an ML model in the plurality of ML models;
detecting a performance change in one of the plurality of ML models;
detecting a new category of ML model; and
receiving a request for re-training from a user.

6. The method of claim 1, wherein inputting a graph fragment into the MSMPGNN comprises inputting an ML model category and wherein generating a prediction based on the graph fragment comprises generating a graph including a set of predicted features for the ML model category.

7. The method of claim 1, wherein inputting a graph fragment into the MSMPGNN comprises inputting an ML model category and a performance indicator and wherein generating a prediction based on the graph fragment comprises generating a graph including a set of predicted features for the ML model category.

8. The method of claim 1, wherein inputting a graph fragment into the MSMPGNN comprises inputting a feature and wherein generating a prediction based on the graph fragment comprises generating a graph including a set of model categories and derivative features.

9. The method of claim 1, wherein inputting a graph fragment into the MSMPGNN comprises inputting an ML model category and a feature and wherein generating a prediction based on the graph fragment comprises generating a graph including a set of derivative features.

10. A non-transitory computer-readable storage medium for tangibly storing computer program instructions capable of being executed by a computer processor, the computer program instructions defining steps of:
retrieving properties associated with a plurality of machine learning (ML) models;
building a graph data structure using the properties, the graph data structure including nodes corresponding to the properties and edges representing connections between the properties;
training a multi-stack message-passing graph neural network (MSMPGNN) using the graph data structure, wherein training the MSMPGNN comprises iteratively updating a state of each node in the graph data structure by aggregating hidden states of neighboring nodes using a message-passing function, and computing, for each node, a positional embedding based on a current positional embedding for the node, a combination of positional embeddings for all neighbors in a neighborhood of the node, and edge vectors between the node and neighbors of the node;

inputting a graph fragment into the MSMPGNN, wherein inputting the graph fragment comprises attaching the graph fragment to the graph data structure and initializing node representations of the graph fragment;

generating a prediction based on the graph fragment using the MSMPGNN by performing message-passing iterations on the graph data structure with the attached graph fragment and applying a readout function to node-level representations; and training a new ML model using the prediction.

11. The non-transitory computer-readable storage medium of claim 10, wherein retrieving the properties comprises retrieving one or more of:

raw features used by the plurality of ML models;

derivative features used by the plurality of ML models;

categories of the plurality of ML models;

feature significance values associated with the plurality of ML models;

category feature significance values associated with the plurality of ML models; and performance statuses associated with the plurality of ML models.

12. The non-transitory computer-readable storage medium of claim 10, wherein training the MSMPGNN comprises, for a given ML model in the plurality of ML models:

initializing a state of the given ML model to a default state;

acquiring at least one hidden state of a second ML model in the graph data structure; and updating the state of the given ML model based on the at least one hidden state.

13. The non-transitory computer-readable storage medium of claim 12, wherein training the MSMPGNN further comprises computing, for each node, a positional embedding based on an aggregation of positional embeddings for all neighbors in a neighborhood of a respective node.

14. The non-transitory computer-readable storage medium of claim 10, wherein inputting a graph fragment into the MSMPGNN comprises inputting an ML model category and wherein generating a prediction based on the graph fragment comprises generating a graph including a set of predicted features for the ML model category.

15. The non-transitory computer-readable storage medium of claim 10, wherein inputting a graph fragment into the MSMPGNN comprises inputting an ML model category and a performance indicator and wherein generating a prediction based on the graph fragment comprises generating a graph including a set of predicted features for the ML model category.

16. The non-transitory computer-readable storage medium of claim 10, wherein inputting a graph fragment into the MSMPGNN comprises inputting a feature and wherein generating a prediction based on the graph fragment comprises generating a graph including a set of model categories and derivative features.

17. The non-transitory computer-readable storage medium of claim 10, wherein inputting a graph fragment into the MSMPGNN comprises inputting an ML model category and a feature and wherein generating a prediction based on the graph fragment comprises generating a graph including a set of derivative features.

18. A device comprising:

a processor configured to:

retrieve properties associated with a plurality of machine learning (ML) models, build a graph data structure using the properties, the graph data structure including nodes corresponding to the properties and edges representing connections between the properties, train a multi-stack message-passing graph neural network (MSMPGNN) using the graph data structure, wherein training the MSMPGNN comprises iteratively updating a state of each node in the graph data structure by aggregating hidden states of neighboring nodes using a message-passing function, and computing, for each node, a positional embedding based on a current positional embedding for the node, a combination of positional embeddings for all neighbors in a neighborhood of the node, and edge vectors between the node and neighbors of the node, input a graph fragment into the MSMPGNN, wherein inputting the graph fragment comprises attaching the graph fragment to the graph data structure and initializing node representations of the graph fragment, generate a prediction based on the graph fragment using the MSMPGNN by performing message-passing iterations on the graph data structure with the attached graph fragment and applying a readout function to node-level representations, and train a new ML model using the prediction.

19. The device of claim 18, wherein retrieving the properties comprises retrieving one or more of:

raw features used by the plurality of ML models;

derivative features used by the plurality of ML models;

categories of the plurality of ML models;

feature significance values associated with the plurality of ML models;

category feature significance values associated with the plurality of ML models; and performance statuses associated with the plurality of ML models.

20. The device of claim 18, wherein training the MSMPGNN comprises, for a given ML model in the plurality of ML models:

initializing a state of the given ML model to a default state;

acquiring at least one hidden state of a second ML model in the graph data structure; and updating the state of the given ML model based on the at least one hidden state.

* * * * *